United States Patent
Schwaiger

(10) Patent No.: US 8,089,183 B2
(45) Date of Patent: Jan. 3, 2012

(54) LEAD FRAME CONNECTOR

(75) Inventor: Dennis Schwaiger, Canton, MI (US)

(73) Assignee: Johnson Electric S.A., La Chaux-de-Fonds (CH)

( * ) Notice: Subject to any disclaimer, the term of this patent is extended or adjusted under 35 U.S.C. 154(b) by 130 days.

(21) Appl. No.: 12/435,628

(22) Filed: May 5, 2009

(65) Prior Publication Data

US 2009/0273248 A1    Nov. 5, 2009

Related U.S. Application Data

(60) Provisional application No. 61/050,382, filed on May 5, 2008.

(51) Int. Cl.
*H02K 11/00* (2006.01)
(52) U.S. Cl. .......................................................... 310/71
(58) Field of Classification Search .................. 310/71, 310/68 B
See application file for complete search history.

(56) References Cited

U.S. PATENT DOCUMENTS

| | | | |
|---|---|---|---|
| 6,600,244 B2* | 7/2003 | Okazaki et al. | 310/71 |
| 7,083,399 B2* | 8/2006 | Kurihara et al. | 417/423.7 |
| 7,365,460 B2* | 4/2008 | Herlet et al. | 310/71 |
| 7,579,732 B2* | 8/2009 | Yamaguchi et al. | 310/71 |
| 7,723,878 B2* | 5/2010 | Yagai et al. | 310/71 |

* cited by examiner

*Primary Examiner* — Nguyen N Hanh
(74) *Attorney, Agent, or Firm* — Muncy, Geissler, Olds & Lowe, PLLC

(57) ABSTRACT

A lead frame connector for windings of an electric motor, has a plurality of fixed electrical conductors embedded in overmoulding material, a plurality of spaced termination points provided through the overmoulding material for electrically connecting the motor windings to the electrical conductors, at least one access opening in the overmoulding material, and at least one terminal of one of the electrical conductors being provided at the access opening for interfacing with a motor control circuit.

16 Claims, 2 Drawing Sheets

LEAD FRAME CONNECTOR

CROSS REFERENCE TO RELATED APPLICATIONS

This non-provisional patent application claims priority under 35 U.S.C. §119(a) from Provisional Patent Application No. 61/050,382 filed in USA on May 5, 2008.

FIELD OF THE INVENTION

The present invention relates to a lead frame connector for windings of an electric motor.

BACKGROUND OF THE INVENTION

Multi-phase electric motors and motors with flux switched brushless stators and bifilar armatures have overlapping armature and field windings. It is not uncommon to have twenty-four wires terminating at five different points on a stator assembly. Four to eight of these wires may also be bifilar with double windings needing to be terminated at respective circuits. It has been recognized that, during production of the motor, the time consuming and intricate termination of these multiple windings causes a bottleneck and results in errors and defects.

The present invention seeks to provide a solution to this problem.

SUMMARY OF THE INVENTION

According to a first aspect of the present invention, there is provided a lead frame connector for windings of an electric motor, the connector comprising a plurality of fixed electrical conductors embedded in overmoulding material, a plurality of spaced termination points provided through the overmoulding material for electrically connecting the motor windings to the electrical conductors, at least one access opening in the overmoulding material, and at least one terminal of one of the electrical conductors being provided at the access opening for interfacing with a motor control circuit.

Preferably, at least one said termination point is formed from two adjacent tangs extending from the overmoulding material.

Preferably, the two tangs define a slot for receiving the end of a respective winding as an interference fit.

Preferably, the two tangs project perpendicularly or substantially perpendicularly relative to a plane of the respective electrical conductor.

Alternatively, at least one said termination point is formed from a slot in the respective electrical conductor, the slot being accessible via a relief in the overmoulding material.

Preferably, the slot extends in the plane of the respective electrical conductor.

Preferably, at least one of the fixed electrical conductors overlaps a portion of another of the fixed electrical conductors.

Preferably, the electrical conductors are supported on a base substrate and are substantially fully covered by the overmoulding material.

Preferably, the connector is annular having a central or substantially central aperture there through.

Preferably, a single said access opening is provided, and a terminal of each electrical conductor is provided at the said access opening.

Preferably, the termination points are provided in distinct spaced groups corresponding to the windings.

Preferably, the connector further comprises attachment means for attaching the connector to an axial end of a motor stator or housing.

According to a second aspect of the invention, there is provided an electric motor having a plurality of motor circuits and a lead frame connector in accordance with the first aspect of the invention, windings of each said circuit being connected to respective termination points of the lead frame connector.

Preferably, the motor further comprises a flux switched brushless stator with a bifilar armature, a three phase brushless stator, or a two phase brushless stator.

Preferably, the motor is a two phase AC induction motor or a three phase AC induction motor.

BRIEF DESCRIPTION OF THE DRAWINGS

Preferred embodiments of the invention will now be described, by way of examples only, with reference to the accompanying drawings, in which:

FIG. 1b is enlarged view of part of the lead frame connector, shown in FIG. 1a;

Figure 1A:
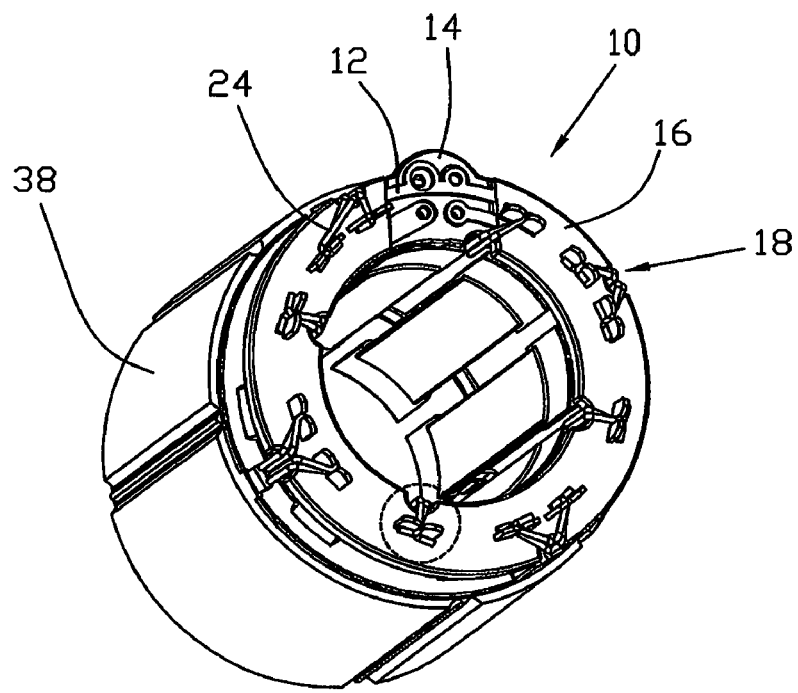
FIG. 1a shows a perspective view of a stator of a multiple circuit electric motor with a first embodiment of a lead frame connector, in accordance with the invention.

In the figures, identical structures, elements or parts that appear in more than one figure are generally labeled with a same reference numeral in all the figures in which they appear. Dimensions of components and features are generally chosen for convenience and clarity of presentation and are not necessarily shown to scale.

DETAILED DESCRIPTION OF THE PREFERRED EMBODIMENTS

Figure 3:
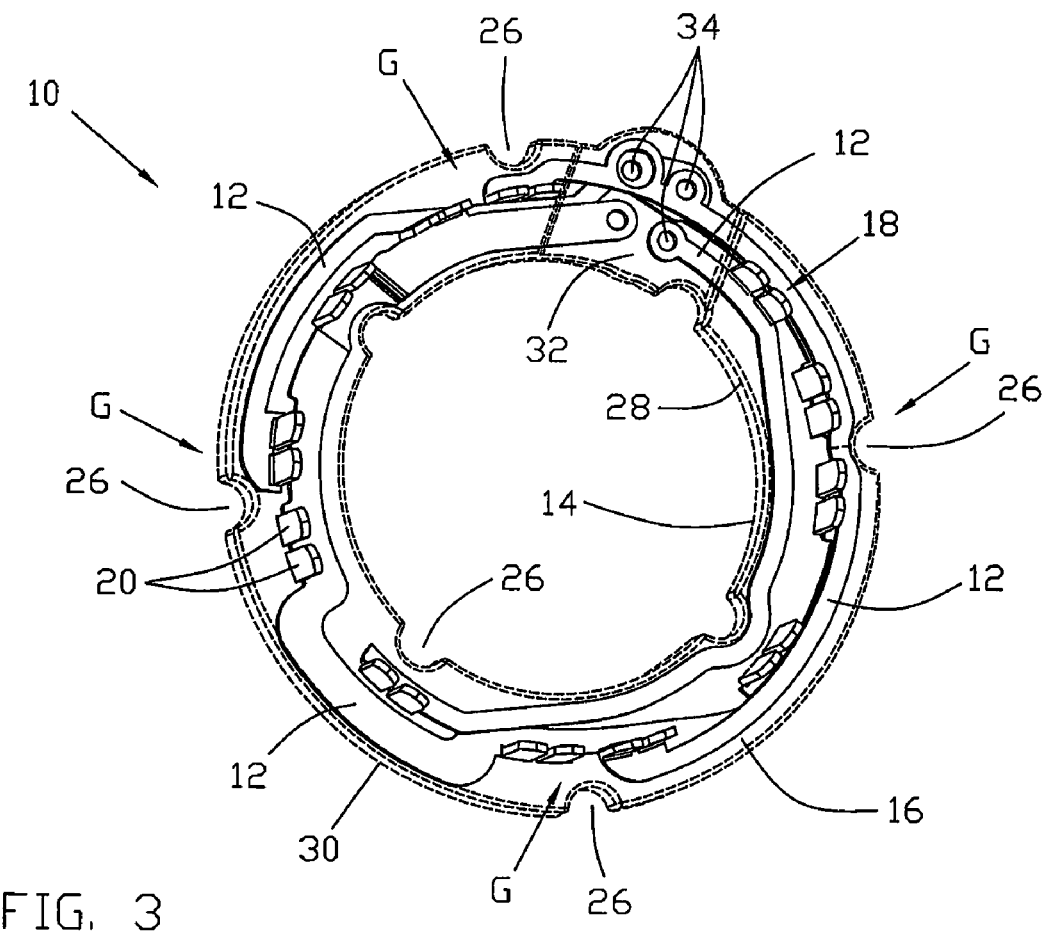
FIG. 3 shows a perspective view of the lead frame connector of FIG. 1.

Referring firstly to FIGS. 1a to 3 of the drawings, there is shown a lead frame connector 10 which comprises a plurality of fixed electrical conductors 12 provided on a thin rigid annular base substrate 14. The conductors 12 are spaced and insulated from each other, are preferably planar and/or arcuate, and are held in fixed spaced relationship by overmoulding material 16, such as resin compound. The conductors 12 and the annular base substrate 14 are embedded in the overmoulding compound. In FIG. 3, the overmoulding material 16 is shown in phantom (dashed lines) to more clearly show the arrangement of the electrical conductors 12. Although one or more of the conductors 12 is stepped, staggered and/or overlaps a portion of at least one of the other conductors in order to accommodate the inside and outside diameters of the motor stator, two, more or all of the conductors may be in the same plane or may be axially spaced to suit the dimensions of the stator.

The lead frame connector 10 also comprises a plurality of spaced winding termination points 18 which, in this embodiment, are flat tangs 20 which extend from the overmoulding material 16. Each termination point 18 is defined by two adjacent tangs 20 which are positioned to provide a winding slot 22 there between. The slot 22 is dimensioned to accept an end of a winding 24 as an interference fit. Resistance welding, such as spot welding, can be conveniently used to fix the or each winding 24 in the slot 22. Alternatively, the slot 22 may form an insulation displacing mechanical connection creating an electrical connection by simply sliding the wire into the slot.

Although shown straight in the preferred embodiment, the slot 22 may be curved to aid fixation of the winding.

Figure 1B:
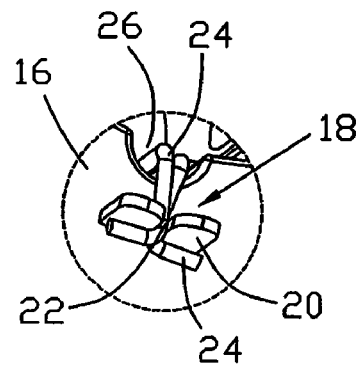
Figure 2:
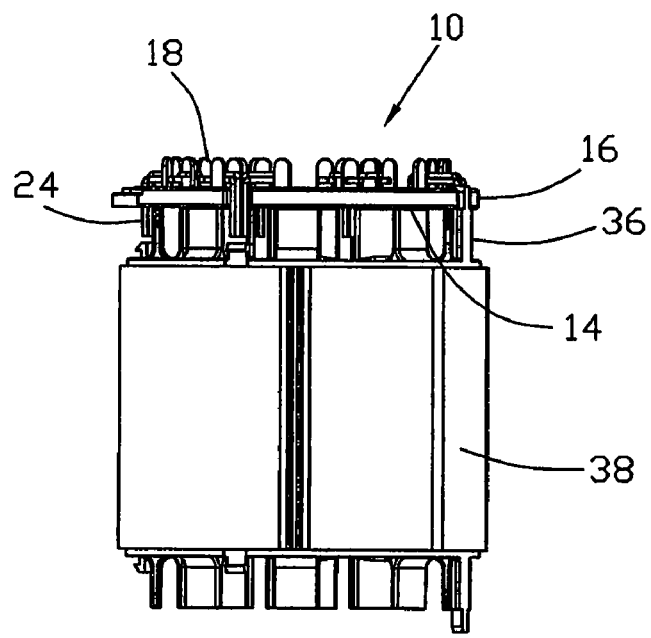
FIG. 2 shows an elevational side view of the stator with the lead frame connector.

Each tang 20 is integrally formed as one-piece with its respective conductor 12 and, in this embodiment, is bent to project perpendicularly or substantially perpendicularly from the immediate plane of its conductor 12. A length of the tangs 20 is sufficient to accept more than one winding 24, as shown in FIG. 1b.

To simplify termination of the various separate windings 24 associated with the multiple motor circuits, the termination points 18 are separated into distinct groups G. Each conductor 12 may have more than one winding termination point 18 along its longitudinal extent. This separation into groups G allows a user or computer-controlled machine to more readily identify which winding 24 should be connected to which termination point 18.

A recess 26 which services each group G of termination points 18 is provided either on an interior edge 28 of the annular lead frame connector 10, or on its exterior edge 30. The recesses 26 are well shown in FIG. 3, and reduce abrasion of the windings 24 through use vibration of the motor.

The overmoulding material 16 is a discontinuous covering, whereby an access opening 32 is provided for interfacing with terminals 34 of the conductors 12. In this embodiment, only a single access opening 32 is provided for all of the interface terminals 34 of the conductors 12. However, a plurality of access openings can be provided in spaced relationship around the connector, if necessary.

The interface terminals 34 of the conductors 12 are integrally formed thereon and reside in the immediate plane of its respective conductor 12. However, any suitable terminal can be utilized. The fixed planar terminals 34 enable simplified electrical connection to at least one motor control circuit which, in use, controls the above-mentioned multiple motor circuits.

In use, the lead frame connector 10 is attached or attachable to a fixed spider 36 which projects from an axial end of the motor stator 38. Attachment means typically comprise bonding, mechanical fixing such as via a screw-threaded fastener, or a push- or snap-fit connections with the spider 36. The separate windings 24 are then fed from the various motor circuits to their respective exterior or interior recesses 26, and from there to the respective grouped termination points 18.

Figure 4:
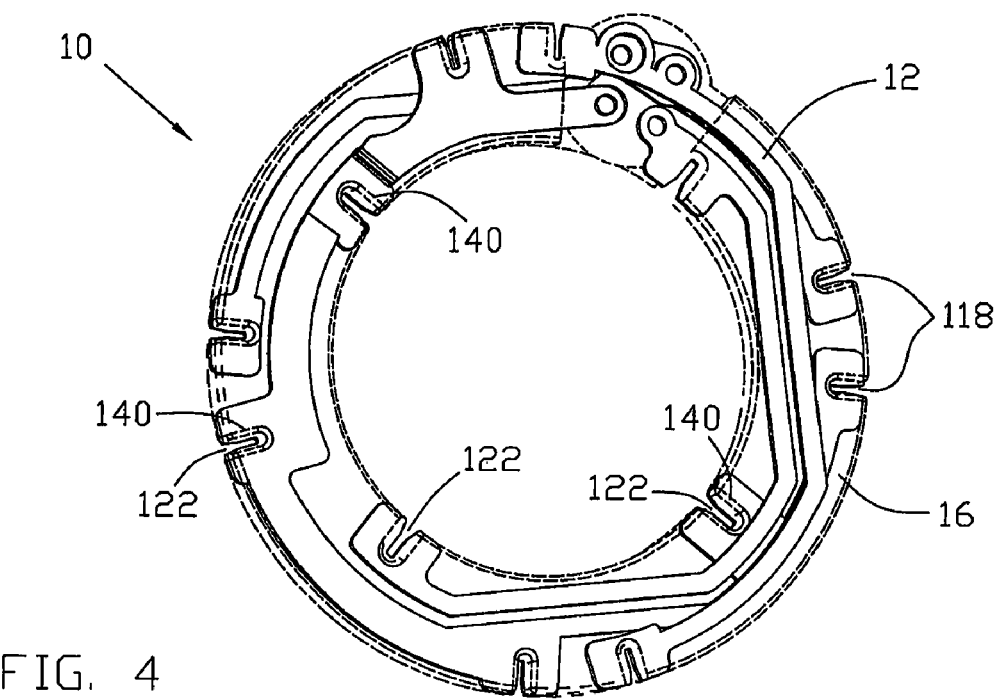
FIG. 4 shows a top plan view of a second embodiment of the lead frame connector.

Referring now to FIG. 4, a second embodiment of the lead frame connector will now be described. The lead frame connector of this embodiment is similar to that of the first embodiment, except for the termination points. As such, like references refer to like parts, and further detailed description is omitted. As in FIG. 3, for ease of understanding the overmoulded material is shown in phantom (dashed lines) to more clearly show the arrangement of the electrical conductors 12.

In this embodiment, each termination point 118 is formed from a slot 122 in the respective electrical conductor 12. The slot 122 extends in the immediate plane of its respective electrical conductor 12, rather than perpendicularly as in the first embodiment. To access the slot 122, a relief 140 is formed in the overmoulding material 16 and base substrate 14.

Although the base substrate is a continuous ring, it may be discontinuous. Furthermore, although the aperture of the annular base substrate is central or substantially central, it may be offset.

Although a base substrate is suggested above, in both embodiments, it may be dispensed with. In this case, the electrical conductors may be embedded or substantially fully encased in the overmoulding material without a base substrate.

Although the connector is annular, it may be any shape. The aperture there through is preferable, in order to receive a shaft of the motor. However, it is feasible that a bearing hub could be mounted centrally or substantially centrally on the lead frame connector in order to support one end of motor shaft.

The lead frame connector may be attachable to a motor housing, instead of or in addition to the motor stator. The stator spider is also a preferred option, but not necessarily essential.

The lead frame connector described above is of particular use with a flux switched brushless stator and bifilar armature, a three phase brushless stator, or a two phase brushless stator.

The lead frame connector is also beneficially used with a two or three phase AC induction motor.

It is thus possible to provide a lead frame connector for mounting on a stator or a motor housing which simplifies the termination of windings from multiple motor circuits, leading to reduced manufacturing time and a decrease in defects.

The use of the term overmoulding material is meant to refer to any suitable material which can be moulded over and about the conductors. Typically such materials include plastics materials and resins, such as those materials used in injection moulding machines, although other types of moulding techniques may be used.

In the description and claims of the present application, each of the verbs "comprise", "include", "contain" and "have", and variations thereof, are used in an inclusive sense, to specify the presence of the stated item but not to exclude the presence of additional items.

Although the invention is described above with reference to preferred embodiments, it should be appreciated by those skilled in the art that various modifications are possible. Therefore, the scope of the invention is to be determined by reference to the claims that follow.

The invention claimed is:

1. A lead frame connector for windings of an electric motor, the connector comprising:
   a plurality of fixed electrical conductors embedded in overmoulding material,
   a plurality of spaced termination points for electrically connecting the motor windings to the electrical conductors,
   at least one access opening in the overmoulding material, and
   at least one terminal of one of the electrical conductors being provided at the access opening for interfacing with a motor control circuit,
   wherein each of the termination points include a slot formed in a respective conductor for receiving an end of a respective winding as an interference fit.

2. The lead frame connector of claim 1, wherein each termination point is formed from two adjacent tangs extending from the overmoulding material and defining the slot therebetween.

3. The lead frame connector of claim 2, wherein the two tangs project perpendicularly or substantially perpendicularly relative to a plane of the respective electrical conductor.

4. The lead frame connector of claim 2, wherein the slots extend in the plane of the respective electrical conductor.

5. The lead frame connector of claim 1, wherein the slots form an insulation displacing connection with the windings.

6. The lead frame connector of claim 1, wherein each slot is accessible via a relief in the overmoulding material.

7. The lead frame connector of claim 1, wherein at least one of the fixed electrical conductors overlaps a portion of another of the fixed electrical conductors.

8. The lead frame connector of claim 1, wherein the electrical conductors are supported on a base substrate and are substantially fully covered by the overmoulding material.

9. The lead frame connector of claim 1, wherein the connector is annular having a central or substantially central aperture there through.

10. The lead frame connector of claim 1, wherein a single said access opening is provided, and a terminal of each electrical conductor is provided at the said access opening.

11. The lead frame connector of claim 1, wherein the termination points are provided in distinct spaced groups corresponding to the windings.

12. The lead frame connector of claim 1, further comprising attachment means for attaching the connector to an axial end of a motor stator or housing.

13. An electric motor having a plurality of motor circuits and a lead frame connector, wherein the lead frame connector comprises a plurality of fixed electrical conductors embedded in overmoulding material, a plurality of spaced termination points which electrically connect windings of each motor circuit to the electrical conductors, at least one access opening in the overmoulding material, and at least one terminal of one of the electrical conductors being provided at the access opening to interface with a motor control circuit, and wherein each of the termination points comprise a slot formed in a respective conductor and in which an end of a respective winding is received as an interference fit.

14. The motor of claim 13, further comprising one of a flux switched brushless stator and bifilar armature, a three phase brushless stator, and a two phase brushless stator.

15. The motor of claim 13, wherein the motor is one of a two and three phase AC induction motor.

16. The motor of claim 13, wherein the slots form an insulation displacing connection with the windings.

* * * * *